July 15, 1952 R. L. HALLOCK 2,603,121
SELF-LOCKING NAIL
Filed Dec. 12, 1945 2 SHEETS—SHEET 2
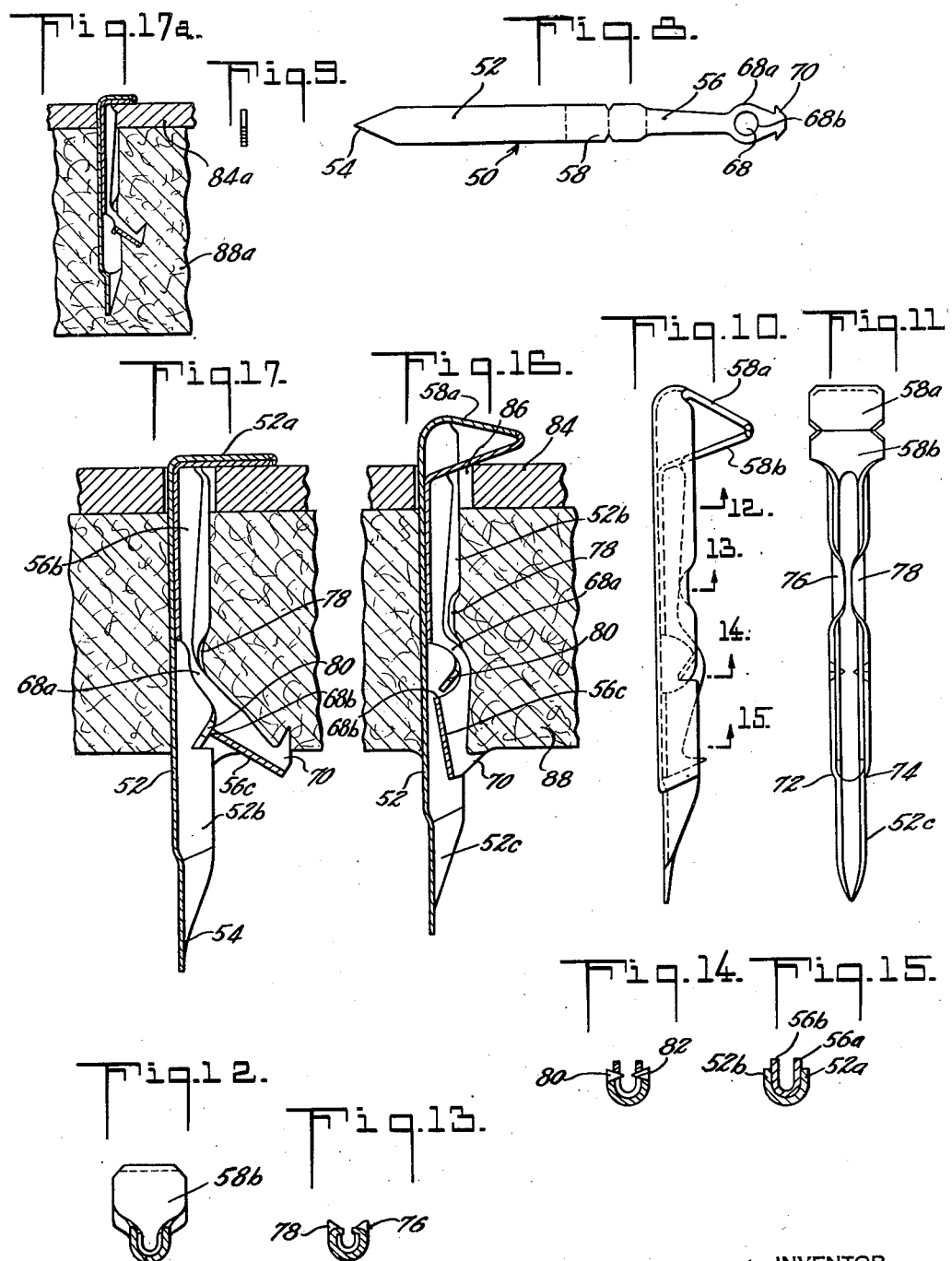
INVENTOR
Robert Lay Hallock
BY
his ATTORNEY Patented July 15, 1952

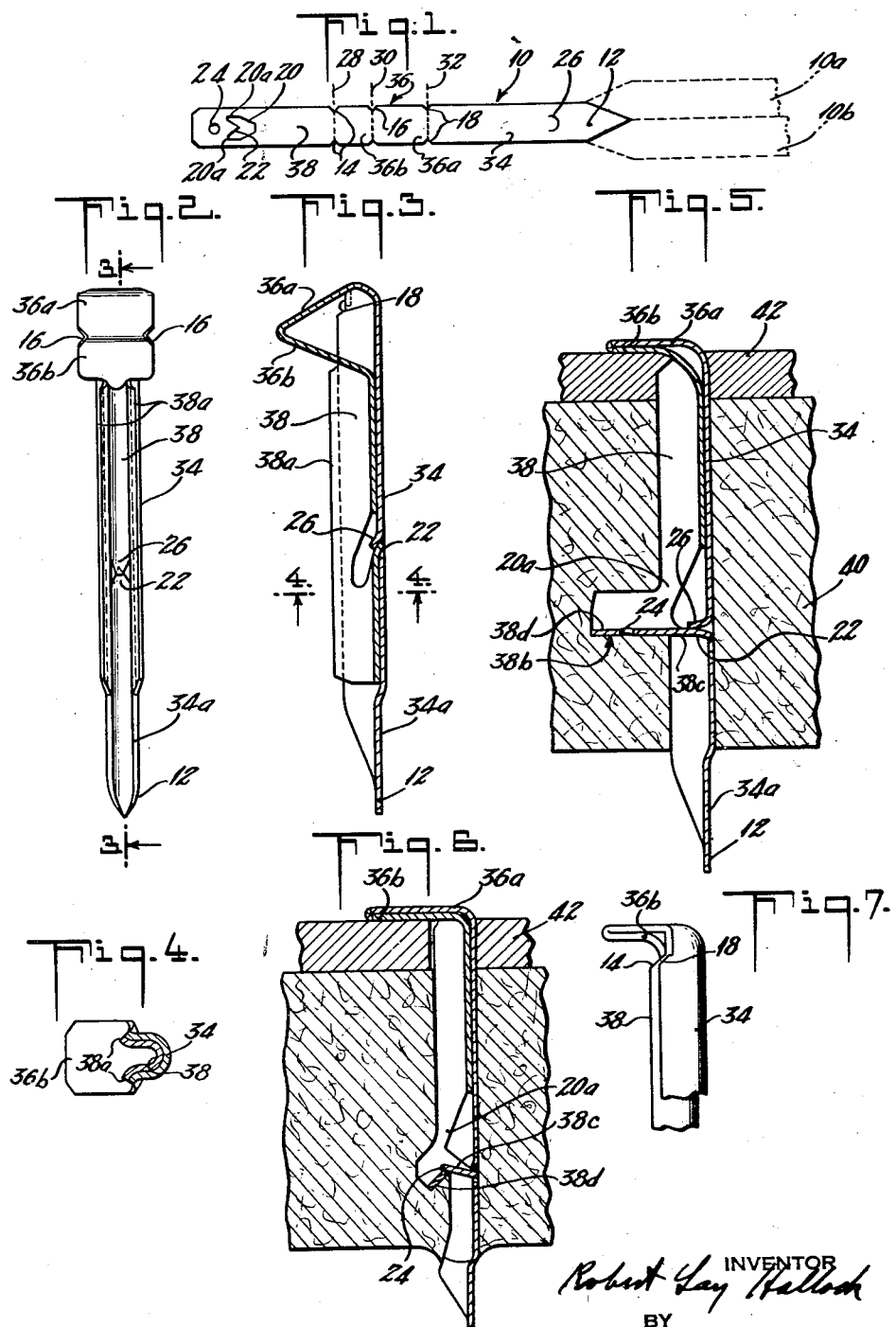

2,603,121

UNITED STATES PATENT OFFICE 2,603,121

SELF-LOCKING NAIL

Robert Lay Hallock, Larchmont, N. Y., assignor to Elastic Stop Nut Corporation of America, Union, N. J., a corporation of New Jersey Application December 12, 1945, Serial No. 634,485

19 Claims. (Cl. 85—11)

This application is a continuation in part with respect to my co-pending applications, S. N. 568,279, filed December 15, 1944, and S. N. 578,153, filed February 16, 1945 (now Patent No. 2,567,935, granted September 18, 1951) and relates back thereto as to all common subject matter.

The present invention relates to self-locking nails and has particular reference to nails which achieve their locking action by distortion to spread a part of the nail laterally when the nail is driven home so as to grip and hold in material of such nature that the ordinary nail will not hold with sufficient strength.

The general object of the invention is to provide a novel and improved form of nail which will afford superior holding power in building materials of a wide variety of kinds such as relatively soft fibrous wallboard materials, which will also be capable of being driven into and holding in harder materials such as asbestos shingles, pressed boards of various kinds and the like, which will be usable with frangible materials such as gypsum or plasterboard and the like, and which will be readily manufacturable by mass production methods at costs comparable to the costs of ordinary nails.

The manner in which the above stated general object and other objects of the invention are obtained and the advantages to be derived from its use will best be understood from a consideration of the ensuing portion of this specification taken in conjunction with the accompanying drawings showing different practical examples of the invention.

In the drawings:

Fig. 1 is a plan view of a blank for forming one kind of nail embodying the invention;

Fig. 2 is a side elevation of a nail formed from the blank shown in Fig. 1;

Fig. 3 is a section taken on the line 3—3 of Fig. 2;

Fig. 4 is a section taken on the line 4—4 of Fig. 3;

Fig. 5 is a view similar to Fig. 3 showing the nail after being driven home in relatively soft material;

Fig. 6 is a view similar to Fig. 5 showing the nail after being driven home in relatively harder material;

Fig. 7 is a fragmentary side elevation taken at right angles to the plane of Fig. 2 and illustrating the head portion of the nail after having been driven home;

Fig. 8 is a view similar to Fig. 1 showing the blank for another kind of nail embodying the invention;

Fig. 9 is an end elevation of the blank shown in Fig. 8;

Fig. 10 is a side elevation of the nail formed from the blank shown in Fig. 8;

Fig. 11 is an elevation of the nail taken at right angles to Fig. 10;

Figs. 12 to 15 inclusive are sections taken on the respectively numbered section lines of Fig. 10;

Fig. 16 is a longitudinal sectional view showing the nail of Fig. 10 partially driven into the material;

Fig. 17 is a section similar to Fig. 16 showing the nail driven home; and

Fig. 17a is a section similar to Fig. 17 showing the nail driven home in material thicker than the length of the nail.

Referring now more particularly to the nail shown in Figs. 1 to 7, the blank 10 for forming the nail consists of a relatively long and narrow strip of sheet metal, usually sheet steel, having parallel sides and a point 12 at one end. In the central region of the strip, there is provided at the sides sets of notches 14, 16 and 18. Adjacent to the end of the strip opposite the pointed end an aperture 20 is formed in the blank which advantageously is of the chevron form indicated. The aperture need not be of this specific form but the opening should be so shaped as to provide a projection preferably pointed, such as the projection 22, pointing away from the adjacent end of the blank. Slightly nearer to the adjacent end of the blank than the aperture 20, a second aperture 24 is advantageously provided which in the present embodiment is shown as a round hole although it may have a different configuration. If desired, the corners of the blank at the end adjacent to the aperture 24 may be rounded, or chamfered as shown. Near its pointed end, the blank is sheared to provide an aperture from which projects a small projection or lip 26 pointing toward the adjacent end of the blank.

By suitable bending and forming operations of known kind, the blank is shaped to the form shown in Figs. 2 and 3. By these operations, the blank is bent along the bend lines 28, 30 and 32 to provide a shank portion 34, a head portion 36, formed by the material between the bend lines 28 and 32, and a shank portion 38.

As will be seen from the drawings, the shank 34 is longer than the shank 38, these shanks lying in adjacent parallel relation and being connected at the head end of the nail by a head of loop-like configuration extending laterally from the axis of the nail and comprising an upper striking portion 36a joining the longer shank 34 and a lower abutment portion 36b joining the shorter shank 38.

Advantageously, the portions 36a and 36b of the looplike head are in the form of flat, plate-like portions arranged in V form and joined by an acute bend, but other specific configurations may be employed.

As will further be seen from the drawings, the shanks 34 and 38 are bent to channel form. In the example illustrated, the channel is of generally U-shaped configuration but it may be V-shaped or of other suitable configuration providing a channel. The channel section is of primary importance with respect to the longer shank 34 and another cross-sectional configuration of the shorter shank 38 may be employed although a channel section for the latter is preferred. The portion of shank 34 extending below the end of the shank 38 is preferably crimped as at 34a to form a narrower channel than the main portion of the shank 34. By this arrangement, the shank 38 is in effect received into the channel of the shank 34 and is substantially sheathed by the shank 34. Advantageously but not necessarily, the lower part of shank 38 may be slightly flared as indicated at 38a in Fig. 4.

When the blank is bent and formed to produce the finished nail the projection 22, which after the bending operation points toward the head end of the nail, is bent outwardly slightly away from the channel side of shank 38 and the projection or lip 26 projecting from the aperture in the shank 34 is bent slightly inwardly toward the channel side of the shank. The two projections, as will be seen from Figs. 2 and 3, abut and in fact overlap. It is preferable to have these projections overlap as shown but this is not essential so long as the projection 26 is in such relation to the projection 22 that the former can act as a stop or abutment for the latter so that the two projections are in effect in interlocking relation. Among other advantages of having the projections overlap is that they act as a retaining means for insuring that the shorter shank is held securely within the channel of the longer shank and further it will be seen from Fig. 5 that when the nail is driven, the projection 26 becomes in effect the upper wall of the aperture in the longer shank into which the projection 22 projects. Thus the overlapping relation of the projections insures the projection 22 being guided and held in the aperture.

In Fig. 5, the nail is shown driven home in relatively soft material, being shown by way of example as driven into a wallboard or the like 40 of soft fibrous material to which a shingle or the like 42 is held by the nail.

The action of the nail will be largely obvious from comparison of Figs. 3 and 5. When the nail is driven through the shingle and into the board 40 to the extent that the abutment portion 36b of the head comes into contact with the surface of the shingle, the head distorts, the driving and abutment portions of the head bending toward each other to flatten out the loop as the nail is driven home. When this occurs, it causes relative longitudinal movement between the shanks, the direction of relative movement being such that the short shank 38 moves toward the head end of the nail relative to the long shank 34. This relative movement causes the projection 26 on the shank 34 to be bent inwardly still further and the projection 22 on shank 38 to move into and be held by the wall of the recess which is in part formed by the projection 26. This action also causes the portion of the shorter shank below the aperture 20 to be bent outwardly away from the axis of the nail by distortion of the relatively narrow webs 20a at the sides of the aperture 20. The interlocking action of the projections operates to maintain the upper part of the shorter shank 38 in its close relation to the longer shank 34.

When, as in the above described case, the nail is distorted in relatively soft material, the portion 38b of the shorter shank which is bent outwardly has sufficient rigidity to bend to approximately the shape shown in Fig. 5, which is productive of the maximum amount of spread of the nail and consequently the maximum amount of holding power, which is desirable in view of the soft material in which the nail is driven.

In order, however, for the nail to have maximum utility it should be capable of being driven into materials of different density and resistance to the spreading action of the nail. It will be observed that the webs 20a, which are distorted when the portion 38b of the shank is bent outwardly, are relatively narrow and weak. Consequently, if the nail were driven into relatively hard material and had to assume the shape shown in Fig. 5 when driven in such material, the webs 20a might not be strong enough to force the portion outwardly in the material to the extent shown in Fig. 5. For this reason, the aperture 24 is provided to weaken the section of the portion 38b to permit it to yield to an extent determined by the resistance offered by the material into which the nail is driven and in Fig. 6, the action of this weakened section is illustrated. The portion 38b is divided by the weakened section into what may be termed a heel part 38c and a toe part 38d and as will be seen from the figure, the weakened section permits the toe part to bend relative to the heel part so that it is not forced so far outwardly into the material. This action does not decrease the efficacy of the nail since obviously if the material into which the nail is driven is sufficiently dense and resistant to cause the bend between the heel and the toe it will likewise be strong and resistant enough to hold the nail against a given withdrawing force, with less lateral spread of the nail than would be the case with the nail driven in soft material such as shown in Fig. 5, in which material full spreading of the nail would be effected.

It will thus be seen that the construction provides a nail of wide applicability for use in materials of different density. In some cases where a quantity of nails is desired for use in a given material, the weakening of the portion of the shank which is bent out may be omitted and the extent of the spreading made proper for the material in which the nail is to be used by proper selection of the distance of the aperture 20 from the free end of the shank, which governs the point of distortion on the shank. By suitably placing this aperture and the corresponding aperture and projection 26, the nail can be suited to different materials.

As previously noted, the interlocking projections which cause the nail to be distorted serve to retain the portion of the shorter shank above the bending point laterally within the longer shank and advantageously further retaining means are provided at the head end of the nail for preventing relative longitudinal movement between the shanks in reverse direction after the nail has been fully driven and the head collapsed. As will be seen from Fig. 1, the bending line 32 is offset slightly from the notches 18 and due to this fact, the longer shank 34 is formed with notches at its head end as will be seen more clearly from Fig. 3. By reference to Fig. 7, it will be seen that the under portion 36b of the head, which is wider than the channel section of the shank 38 and also of the channel section of the shank 34, by virtue of the notches 14, can snap into the recess provided by the notches 18.

This snap action provides a lock preventing movement of the shank 38 in a direction away from the head end of the nail relative to shank 34 after the nail has been driven home.

In Figs. 8 through 17a, another form of nail embodying the invention is illustrated. This form is made from a blank 50 having the shape shown in Fig. 8 providing a portion 52 for forming the longer shank of the nail, which is preferably pointed as shown at 54. The shorter shank is formed from the portion 56 and the head portion 58 lies between the bend lines 60 and 62. The blank is provided with notches 64 at the bend line 66. Near its free end, the shank portion 56 is enlarged to provide for an aperture 68 which as shown is round but may have different configuration and at its end, the blank is advantageously provided with a barb 70. The barbed end portion is connected to the main body of the shank portion by the relatively narrow webs 68a at the sides of the aperture 68.

The longer shank 52 is bent to channel form providing flanges 52a and 52b and the shorter shank is also bent to channel form having flanges 56a and 56b. As will be seen from the drawings, the shorter shank is received substantially within the channel of the longer shank and terminates short of the sharpened or penetrating end of the longer shank. Below the end of the shorter shank, the longer shank is advantageously bent to form a narrower channel section 52c, the flanges of the two channel sections of different widths being connected by the inclined shoulders 72 and 74. Toward the head end of the nail, the flanges 52a and 52b of the longer shank are bent toward each other to provide retaining ears or lugs 76 and 78 which overlie the shorter shank as seen in Figs. 11 and 13 to retain the upper portion of the shorter shank within the channel of the longer shank. Below the projections 76 and 78, the flanges of the longer shank are slit transversely inwardly a short distance from the edges of the channels and the portions adjacent to these slits on one side are bent inwardly along an inclined line to form inturned projections providing abutments 80 and 82 which bear against the wall portions 68a forming part of the perimeter of aperture 68 in the shorter shank. These wall portions provide what are in effect cam surfaces adapted to co-act with the abutments 80 and 82 which are in effect wedging or cam projections on the longer shank. In forming the nail, the projections 80 and 82 are formed on the flanges of the longer shank before the shorter shank is folded into the recess provided by the channel in the longer shank. Thereafter, the retaining lugs 76 and 78 are bent over to hold the parts in assembled relation, and the narrowing of the end of the channel of the longer shank is also preferably performed after the parts are in assembled relation so that the inclined shoulders 72 and 74 will bear lightly against the sides of the barbed end 70 of the shorter shank and act as a retaining means for keeping the free end of this shank within the channel of the longer shank until it is forced out when the nail is used.

The head portion 58 of the nail is bent to loop-like form to provide an upper or striking portion 58a and a lower or abutment portion 58b and in the form shown, these portions of the head are in the form of flat plate-like parts arranged to form between them a V joined by an acute bend. Other forms of head configuration may be employed.

In Figs. 16 and 17 the action of the nail in use is illustrated, the particular use shown being for attaching a shingle 84 of hard material having a pre-formed nail hole 86 to a body of relatively soft fibrous material or the like 88.

In Fig. 16, the nail is shown partially driven to the point where the abutment portion 58b of the nail head has contact with the surface of the shingle and, acting as an abutment, has pulled the shorter shank 56 relative to the longer shank 52 toward the head end of the nail, this relative movement being permitted by the distortion of the loop-like head portion. The upper portion of the shorter shank is retained within the channel during this movement by the ears 76, 78 and the co-action between the cam surfaces provided by the webs 68a and the abutments 80, 82 distorts the shorter shank to force the lower end 56c outwardly through the bending action of the relatively narrow webs 68a.

In Fig. 17, the nail is shown driven fully home with the driving and abutment portions of the head flat against the surface of the shingle and against each other to form a flat nail head. This further distortion of the head moves the shorter shank further relative to the longer shank and forces the end 56c further laterally. By the time this action has taken place, the abutments 80, 82 have reached the bottom wall portion 68b of the perimeter of the aperture 68 and act as locking abutments resisting inward movement of the projecting lower end of the distorted shank. The action is similar in nature to an irreversible cam or worm.

While in Figs. 16 and 17, the nail has been shown driven through a shingle with a pre-formed nail hole and also through softer material having less thickness than the length of the nail, the utility of the nail is not limited to such construction and in Fig. 17a the nail is shown driven through a shingle 84a not provided with a pre-formed hole and into material 88a thicker than the length of the nail.

From the foregoing, it will be apparent that both of the nails hereinbefore described operate in accordance with the same basic principles, the major difference in their construction being in the means by which the bending or deformation of the nail is accomplished when it is driven home. In each case, the spreading of the nail is accomplished by relative longitudinal movement between the shanks of the nail, which movement is effected by the distortion or collapsing of the distortable head when the nail is driven home.

It will be apparent that specific details of design can be altered considerably as for example where notches, apertures and the like are employed to weaken the section of the metal to enable bending or distortion to be readily effected. Other expedients for providing the desired weakening at the critical points may be resorted to and obviously the particular shape of the notches and/or openings may be changed. While in the form of nail shown in Fig. 8 and related figures, the weakening of the portion of the shorter shank which is forced outwardly has not been illustrated, it will be evident that the same arrangement may be employed as in the form of nail shown in Fig. 1 and related figures for making the same design of nail applicable for use in materials of different densities. In this connection, it is to be noted that in the form of nail shown in Fig. 8 and related figures, and without providing any weakened section in the part of the shorter shank which is forced outwardly into the material, the nail can readily be designed specifically for a given grade of material by selection of the distance between the ears or tabs 76, 78 and the abutments 80, 82. The shorter the distance between these two sets of elements, the greater will be the extent to which the distorted shank is forced outwardly. Consequently, in a nail designed for use in relatively soft materials, this distance should be greater than in a nail designed for use with harder and more resistant materials.

While various specific distortable structures may be employed within the scope of the invention to effect the desired locking action, the preferred arrangement is such that the shorter shank is distorted while the longer shank remains undistorted.

Regardless of design details, it is characteristic of the nail that the spreading action is obtained by bending the lower portion of the holding shank laterally away from the driving shank which has more lateral rigidity than the holding shank and remains straight, the holding shank having sufficient lateral rigidity to insure its capability of penetrating into or through materials of the kind with which it is intended to be used.

Also, the channel form of the driving shank, in addition to providing the desired rigidity against lateral bending, enables the shorter shank to be formed as desired for most advantageously effecting its function, without regard to its resistance to longitudinal compression, since the driving shank, by in effect sheathing the shorter shank, prevents strong compressive force on the latter while the nail is being driven, which force if excessive might distort the shorter shank or even prematurely tend to collapse the distortable head.

While as previously noted, the head may take various specific configurations, the form shown is to be preferred since as will readily be apparent, this form readily distorts to provide a flat head of substantial area, the size of which can be whatever may be selected in laying out the blank. Thus with this form of construction the head area can be selected in accordance with the nature of the material with which the nail is to be used, the softer the material, the larger being the desirable size of head to prevent it pulling through the material and also to insure proper collapsing of the head when the abutment portion strikes the surface of the material into which the nail is driven.

Referring again to Fig. 1, it will be evident that the nail can be blanked economically from sheet material without appreciable waste by laying out the blanks in end to end relation as indicated by the dotted line blank parts shown at 10a and 10b in Fig. 1. Obviously, the same blank arrangement for cutting from sheet material can be employed for blanks of the kind shown in Fig. 8.

From the foregoing, it will be readily apparent that the invention is subject to a wide variety of changes and specific forms of designs and that certain features of construction hereinbefore described may be employed to the exclusion of others depending upon the specific purpose for which the nail is intended. The invention is accordingly to be considered as embracing all forms of construction falling within the scope of the appended claims.

What is claimed:

1. An integral one piece sheet metal nail comprising a driving shank, a holding shank adjacent to said driving shank, said holding shank being laterally bendable and said driving shank being pointed at the penetrating end of the nail and relatively rigid against lateral bending, a collapsible head connecting said shanks at the head end of the nail, said head comprising an upper driving portion connected to said driving shank and providing a striking place adapted to be struck by a tool to drive the nail and a lower abutment portion connected to said holding shank and providing an abutment for engaging a work surface to cause said head to collapse when the nail is driven home and thereby produce relative longitudinal movement between the shanks, said holding shank having a relatively weak portion intermediate its ends for establishing a predetermined bending place in the shank, and means comprising a projection on said holding shank and a co-operating aperture in said driving shank into which said projection extends to engage the driving shank and provide a fulcrum point about which the penetrating end portion of said holding shank is caused to bend laterally away from said driving shank upon said relative movement between the shanks.

2. An integral one piece sheet metal nail comprising a driving shank of channel form, a holding shank adjacent to and located at least in part in the channel of said driving shank, said holding shank being laterally bendable and said driving shank being pointed at the penetrating end of the nail and relatively rigid against lateral bending, a collapsible head connecting said shanks at the head end of the nail, said head comprising an upper driving portion connected to said driving shank and providing a striking place adapted to be struck by a tool to drive the nail and a lower abutment portion connected to said holding shank and providing an abutment for engaging a work surface to cause said head to collapse when the nail is driven home and thereby produce relative longitudinal movement between the shanks, said holding shank having a relatively weak portion intermediate its ends for establishing a predetermined bending place in the shank, said driving shank having an aperture in the base of the channel adjacent to said bending place in said holding shank and said holding shank having a projection extending into said aperture to engage the driving shank and provide a fulcrum point about which the penetrating end portion of said holding shank is caused to bend laterally away from said driving shank upon said relative movement between the shanks.

3. An integral one piece sheet metal nail comprising a laterally relatively rigid driving shank of channel form, a holding shank of channel form substantially nested in the channel of the driving shank, a collapsible head connecting said shanks at the head end of the nail, said head comprising an upper driving portion connected to said driving shank and providing a striking place adapted to be struck by a tool to drive the nail and a lower abutment portion connected to said holding shank and providing an abutment for engaging a work surface to cause said head to collapse when the nail is driven home and thereby produce relative longitudinal movement between the shanks, said holding shank having an aperture intermediate its ends providing a substantially weakened portion establishing a predetermined bending place in the shank, said driving shank having an aperture in the base of the channel adjacent to said bending place in said holding shank, a portion of the perimeter of the aperture in the holding shank providing a projection extending into the aperture in the driving shank to engage the driving shank and provide a fulcrum point about which the penetrating end portion of said holding shank is caused to bend laterally away from said driving shank upon said relative movement between the shanks.

4. An integral one piece sheet metal nail comprising a driving shank of channel form, a holding shank adjacent to said driving shank, said holding shank being laterally bendable and said driving shank being pointed at the penetrating end of the nail and relatively rigid against lateral bending, a collapsible head connecting said shanks at the head end of the nail, said head comprising an upper driving portion connected to said driving shank and providing a striking place adapted to be struck by a tool to drive the nail and a lower abutment portion connected to said holding shank and providing an abutment for engaging a work surface to cause said head to collapse when the nail is driven home and thereby produce relative longitudinal movement between the shanks, said holding shank having an aperture intermediate its ends providing a substantially weakened portion establishing a predetermined bending place in the shank, said driving shank having an aperture in the base of the channel adjacent to said bending place in said holding shank, a portion of the aperture in the holding shank providing a projection extending obliquely toward the head end of the nail into the aperture in the driving shank to engage the driving shank to hold the shanks laterally together at the place of engagement and to provide a fulcrum point about which the penetrating end portion of said holding shank is caused to bend laterally away from said driving shank upon said relative movement between the shanks.

5. An integral one piece sheet metal nail comprising a driving shank of channel form, a holding shank adjacent to said driving shank, said holding shank being laterally bendable and said driving shank being pointed at the penetrating end of the nail and relatively rigid against lateral bending, a collapsible head connecting said shanks at the head end of the nail, said head comprising an upper driving portion connected to said driving shank and providing a striking place adapted to be struck by a tool to drive the nail and a lower abutment portion connected to said holding shank and providing an abutment for engaging a work surface to cause said head to collapse when the nail is driven home and thereby produce relative longitudinal movement between the shanks, said holding shank having an aperture intermediate its ends providing a substantially weakened portion establishing a predetermined bending place in the shank, said driving shank having an aperture in the base of the channel adjacent to said bending place in said holding shank, a portion of the perimeter of each of said apertures providing a projection, the projection on the holding shank extending obliquely toward the head end of the nail, the projection on the driving shank extending obliquely in the opposite direction and the two projections engaging in overlapping relation to hold the shanks laterally together at the place of engagement and to provide a fulcrum point about which the penetrating end portion of said holding shank is caused to bend laterally away from said driving shank upon said relative movement between the shanks.

6. An integral one piece sheet metal nail comprising a laterally relatively rigid driving shank of channel form, a shorter holding shank substantially nested in a first portion of the channel of said driving shank, said holding shank being laterally bendable and the channel of said driving shank comprising a second portion provided with a pointed end, and of smaller cross section than said first portion for substantially masking the end of the shorter holding shank, a collapsible head connecting said shanks at the head end of the nail, said head comprising an upper driving portion connected to said driving shank and providing a striking place adapted to be struck by a tool to drive the nail and a lower abutment portion connected to said holding shank and providing an abutment for engaging a work surface to cause said head to collapse when the nail is driven home and thereby produce relative longitudinal movement between the shanks, said holding shank having a relatively weak portion intermediate its ends for establishing a predetermined bending place in the shank, and means comprising a projection on said holding shank and a co-operating aperture in said driving shank into which said projection extends to engage the driving shank and provide a fulcrum point about which the penetrating end portion of said holding shank is caused to bend laterally away from said driving shank upon said relative movement between the shanks.

7. An integral one piece sheet metal nail comprising a driving shank, a holding shank adjacent to the driving shank and a collapsible head joining said shanks for causing relative longitudinal movement between the shanks when the head is collapsed, said holding shank having a first weakened place intermediate its ends, means on said shanks engaging adjacent to said weakened place to provide a fulcrum point about which a holding portion of the holding shank on the side of said weakened place remote from the head end of the nail is caused to bend laterally away from said driving shank due to said relative movement, and said holding shank having a second weakened place in said holding portion to permit said holding portion to yield so that the extent of outward movement thereof is governed by the resistance of the material into which it is forced.

8. An integral one piece sheet metal nail comprising driving and holding shanks of channel form and a collapsible head joining said shanks for causing relative longitudinal movement between the shanks when the head is collapsed, said holding shank having an aperture therein intermediate its ends for substantially weakening the shank to establish a predetermined place of bending, means on said shank engaging to provide a fulcrum point about which a holding portion of said holding shank on the side of said aperture remote from the head end of the nail is caused to bend laterally away from said driving shank due to said relative movement, and said second shank having a second aperture in said holding portion to permit said holding portion to yield so that the extent of outward movement thereof is governed by the resistance of the material into which it is forced.

9. In a nail of the character described, a continuous strip of sheet metal formed to provide a head of loop like form extending laterally from the axis of the nail and having spaced upper and lower ends, a first shank depending from said upper end and a second shank depending from said lower end, said head being collapsible to cause said shanks to have relative movement when the head is collapsed to bring said spaced ends together, said first shank being of channel form and narrower than said head and the walls of the channel being notched adjacent to the place of juncture between the shank and the head to engage and hold the lower end of said head when the head is collapsed.

10. In a nail of the character described, a continuous strip of sheet metal formed to provide a laterally extending head comprising two angularly related flat portions forming between them a V, a first shank depending from the end of a first one of said portions, a second shank depending from the end of the second one of said portions and being adjacent to the first shank, said head being collapsible about the apex of the V to cause relative movement between the adjacent shanks, said first shank being of channel form and narrower than said second portion of said head and the walls of the channel being notched adjacent to the place of juncture between said first shank and said first portion of the head to engage and hold the end of said second portion when the head is collapsed.

11. A nail comprising two adjacent shanks of unequal length and a distortable head connecting said shanks, the longer of said shanks providing a channel substantially sheathing the shorter shank and extending beyond the shorter shank at both ends of the latter and providing at one end a sharpened penetrating end for the nail, said head being of loop-like form providing an upper striking portion joining the head end of the longer shank and a lower abutment portion joining the head end of the shorter shank, said portions being bent toward each other to move the shorter shank relative to the longer shank toward the head end of the nail when the nail is driven home, and means on said shanks engaging at a place intermediate the ends of the nail to cause the lower portion of at least one of said shanks to be distorted intermediate its ends and the lower portion thereof bent outwardly away from the axis of the nail due to said relative movement.

12. A nail as set forth in claim 11, in which the portions of said head are shaped to form between them a V.

13. A nail as set forth in claim 11 in which the portions of said head are of substantially flat, plate-like form bent relative to each other to form between them a V.

14. A nail as set forth in claim 11 in which the upper portions of both of said shanks are of channel section.

15. A nail as set forth in claim 11, in which both of said shanks are of channel section, the longer shank extending below the shorter shank at the penetrative end of the nail and the extending portion of the longer shank being bent to form a narrower channel than that formed in the upper portion of the shank.

16. A nail comprising two adjacent shanks of unequal length and a distortable head connecting said shanks, the longer of said shanks providing a channel for the reception of the upper portion of the shorter shank and having means engaging the upper portion of the shorter shank for restraining said portion against lateral displacement, said longer shank extending beyond the shorter shank at both ends of the latter and providing at one end a sharpened penetrating end for the nail, said head being of loop-like form providing an upper striking portion joining the head end of the longer shank and a lower abutment portion joining the head end of the shorter shank, said portions being bent toward each other to move the shorter shank relative to the longer shank toward the head end of the nail when the nail is driven home, and means on said shanks engaging at a place intermediate the ends of the nail to cause the lower portion of at least one of said shanks to be distorted intermediate its ends and the lower portion thereof bent outwardly away from the axis of the nail due to said relative movement.

17. A nail formed from a continuous strip of sheet metal bent to form two adjacent shanks of unequal length, the longer shank constituting a driving shank extending beyond the shorter shank at the head end of the nail and having its upper portion formed to channel section, the shorter shank being disposed in said channel and the head ends of the shanks being joined by a laterally extending head of loop-like form providing an upper striking portion joining the longer shank and a lower abutment portion joining the shorter shank, said portions being bent toward each other when the nail is driven home to move the shorter shank relative to the longer shank toward the head end of the nail, retaining means on said longer shank for restraining the upper portion of the shorter shank against lateral movement from the longer shank when said relative movement takes place, and means on said shanks engaging below the first mentioned means for causing lateral distortion of the lower portion of the nail due to said relative movement.

18. A nail as set forth in claim 17 in which the last mentioned means comprises an aperture in the shorter shank providing a weakened place therein, portions of the wall of said aperture providing cam surfaces and projections on the longer shank engaging said cam surfaces to bend the free end of the shorter shank outwardly away from the longer shank due to said relative movement.

19. A nail as set forth in claim 18 in which the free end of the shorter shank is provided with a barb.

ROBERT LAY HALLOCK.

REFERENCES CITED

The following references are of record in the file of this patent:

UNITED STATES PATENTS

| Number | Name | Date |
|---|---|---|
| 1,056,190 | Lorenz | Mar. 18, 1913 |
| 1,114,525 | Rider | Oct. 20, 1914 |
| 1,532,148 | Malone | Apr. 7, 1925 |
| 1,864,424 | Franklin | June 21, 1932 |